United States Patent
Osada

[19]

[11] Patent Number: 6,004,485
[45] Date of Patent: Dec. 21, 1999

[54] METHOD FOR MAKING A TEMPERATURE SENSOR

[75] Inventor: Katsuhisa Osada, Miyagi-ken, Japan

[73] Assignee: Alps Electric Co., Ltd., Japan

[21] Appl. No.: 08/570,793

[22] Filed: Dec. 12, 1995

[30] Foreign Application Priority Data

Dec. 13, 1994 [JP] Japan .................................. 6-309197

[51] Int. Cl.$^6$ .............................. H01B 1/04; H01C 7/10; C01B 31/00
[52] U.S. Cl. ..................... 252/510; 252/511; 338/22 R; 264/29.1; 264/29.5
[58] Field of Search ............................ 338/22 R, 225 D, 338/25, 18, 225; 219/505; 374/185; 252/510, 502, 511; 29/612; 423/445; 264/29.1, 29.5

[56] References Cited

U.S. PATENT DOCUMENTS

| | | | |
|---|---|---|---|
| 1,403,803 | 1/1922 | Maxfield et al. | 252/511 |
| 2,050,357 | 8/1936 | McCulloch | 252/511 |
| 3,966,578 | 6/1976 | Sommer | 204/192.14 |
| 4,193,860 | 3/1980 | Folser | 204/284 |
| 4,547,310 | 10/1985 | Kasanami et al. | 252/511 |
| 4,577,979 | 3/1986 | Kalnin et al. | 374/178 |
| 5,175,214 | 12/1992 | Takaya et al. | 252/511 |
| 5,407,741 | 4/1995 | Ota | 428/323 |
| 5,431,844 | 7/1995 | Nishiwaki | 252/511 |
| 5,603,867 | 2/1997 | Ohsaki et al. | 252/502 |

FOREIGN PATENT DOCUMENTS

| | | |
|---|---|---|
| 57-124221 | 8/1982 | Japan . |
| 3-96824 | 4/1991 | Japan . |

*Primary Examiner*—Mark Kopec
*Attorney, Agent, or Firm*—Brinks Hofer Gilson & Lione

[57] ABSTRACT

A temperature sensor which can be used at ordinary temperatures is provided. After a lamination plate of a phenol resin is carbonized at 640 to 750° C., the powder of the carbonized material and the binder formed of a thermosetting resin, such as phenol or epoxy, are kneaded and formed into a paste, after which this paste is printed between terminals of a base film, such as polyimide, having a high resistance to heat and is calcined at a low temperature. Thus, a temperature sensor such that a resistance element is printed on the base film is obtained. The temperature sensor shows a large change of the resistance value with respect to an environment temperature change at ordinary temperatures.

2 Claims, 3 Drawing Sheets

METHOD FOR MAKING A TEMPERATURE SENSOR

BACKGROUND OF THE INVENTION

1. Field of the Invention

The present invention relates to a temperature sensor, such as a clinical thermometer or a thermometer, for use at ordinary temperatures.

2. Description of the Related Art

As temperature sensors, generally speaking, temperature sensors using a change in resistance of a noble metal, such as platinum (Pt), or temperature sensors using oxide semiconductors of Mn or Co are known. However, since starting materials of such temperature sensors are expensive or must be calcined at high temperatures, it is difficult to reduce the cost of the temperature sensor. Accordingly, an inexpensive temperature sensor using carbon as a temperature-sensing resistance element has hitherto been proposed.

The above-described temperature sensor is formed in such a way that a paste is obtained by mixing and dispersing carbon powder extracted by calcining and carbonizing acetylene gas into an epoxy resin, this paste is coated between electrodes provided on a base film, after which the paste is printed to form a temperature-sensing resistance element. In principle, this is a temperature sensor which uses a resistance value when the temperature-sensing resistance element is brought into contact with an object to be measured, and a thermal equilibrium state is reached.

An infrared sensor has also been proposed which is arranged in such a way that coal pitch or the like is heat-treated in an inert gas at 650° to 720° C. in order to form carbon fibers, and the carbon fibers are stretched or crossed between the electrodes.

The above-described conventional carbon resistance temperature sensor having carbon powder mixed and dispersed into an epoxy resin makes it possible to reduce the cost in comparison with a temperature sensor using noble metals or oxide semiconductors because carbon powder which is a starting material of the temperature-sensing resistance element is inexpensive and the paste can be printed at relatively low temperatures. However, the resistivity of the carbon powder which is obtained by carbonizing acetylene gas at a high temperature of 1,800° C. is extremely small, and a change in the resistance value of the temperature-sensing resistance element with respect to the change in the environment temperature is small considerably. Therefore, the range of temperature measurements is limited to extremely low temperatures of approximately 4.2 to 20 (K), and measurements are impossible at ordinary temperatures.

The conventional infrared sensor using carbon fibers has problems, for example, the shape is limited because the sensor is in a fibrous shape.

SUMMARY OF THE INVENTION

The present invention has been achieved in view of such actual situation of the prior art. It is an object of the present invention to provide a temperature sensor which can be used at ordinary temperatures and can be formed by printing.

To achieve the above-described object, the temperature sensor of the present invention provides features that a carbonized powder having an activation energy of 0.06 to 0.27 eV at a carbonization temperature of 640 to 750° C. is used as a resistance element disposed between electrodes, and this resistance element is formed by calcining a paste in which the carbonized powder mixed and dispersed into a binder at a temperature lower than 640° C.

As the above-mentioned carbonized powder, difficult-to-graphitize materials, such as a phenol resin, furfuryl alcohol, vinylidene chloride, cellulose, and/or wood, are preferably used, and such material is used as a resistance element in a powder state. The carbonized powder is mixed and dispersed into a binder resin and formed into a paste. This paste is printed between the terminals of the base film, or the paste is formed on the ends of a pair of lead wires, after which the paste is calcined at a temperature lower than 640° C. Thus, a temperature sensor can be obtained in which a resistance element is directly formed on a base film and lead wires.

In the temperature sensor of the present invention, as a resistance element disposed between electrodes, a carbonized powder having an activation energy of 0.06 to 0.27 eV at a carbonization temperature of 640 to 750° C. is used, and this resistance element is formed by calcining a paste in which the carbonized powder mixed and dispersed into a binder resin at a temperature lower than 640° C. Therefore, formation by printing is possible, and the total cost of the temperature sensor, including the cost of the materials and the manufacturing cost can be reduced considerably. The temperature sensor shows a large change in the resistance value with respect to a change in the environment temperature at ordinary temperatures.

The above and further objects, aspects and novel features of the invention will become more apparent from the following detailed description when read in connection with the accompanying drawings.

DESCRIPTION OF THE PREFERRED EMBODIMENT

A preferred embodiment of the present invention will be described below with reference to the accompanying drawings.

Figure 1:
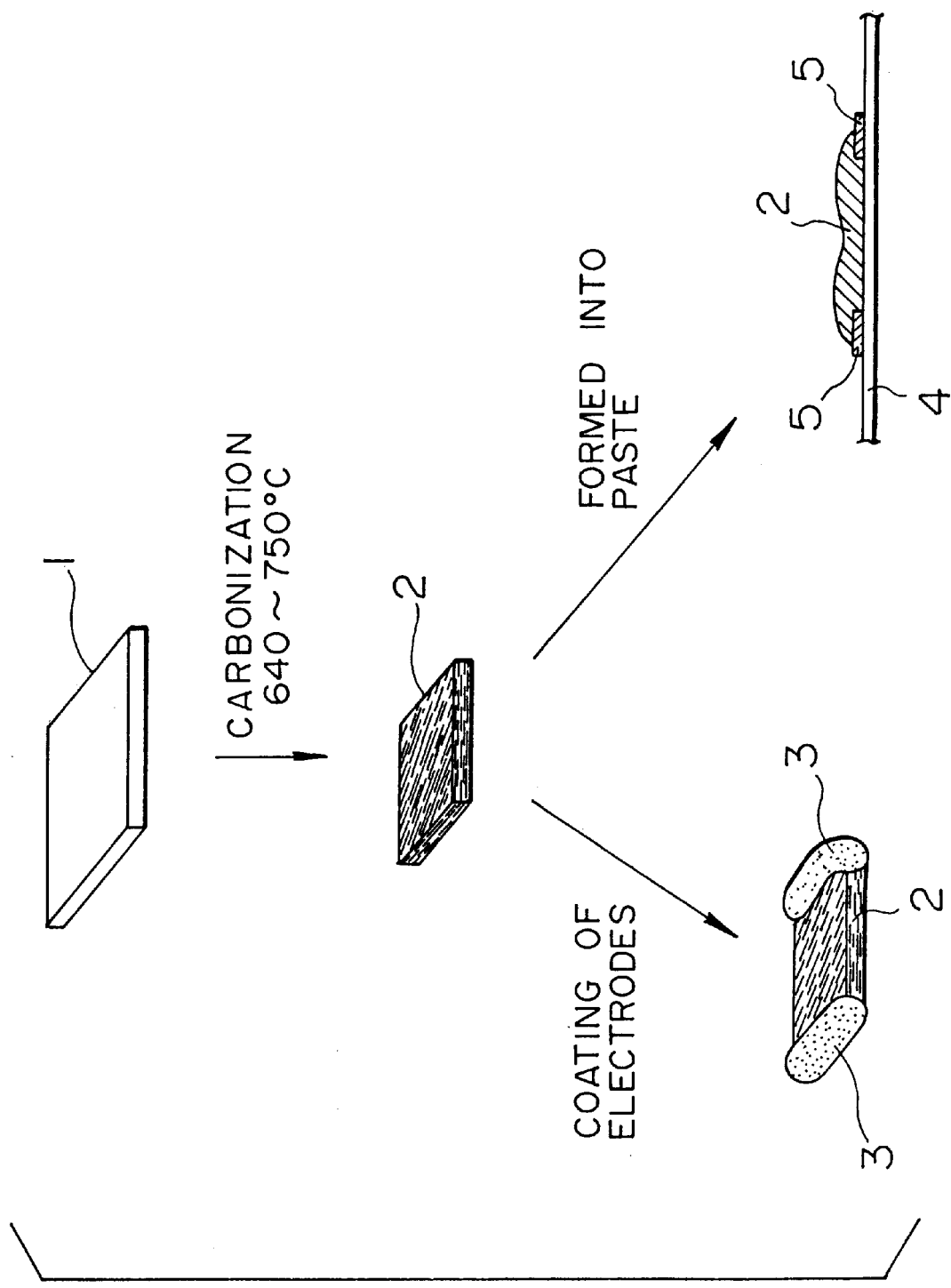
FIG. 1 is an illustration showing steps for manufacturing a temperature sensor in accordance with an embodiment of the present invention and a comparative example.

FIG. 1 shows steps for manufacturing a temperature sensor in accordance with an embodiment of the present invention. Initially, a lamination plate 1 of a phenol resin is carbonized at 640 to 750° C. A resistance element 2, which is a carbonized powder of the lamination plate 1, is obtained. The powder of the resistance element 2 and a binder formed of a thermosetting resin, such as phenol or epoxy, are kneaded into a paste, after which this paste is printed between terminals 5 of a base film 4, such as polyimide, having a high resistance to heat, and the paste is calcined at 120 to 240° C. Thus, a temperature sensor which is printed on the base film 4 is obtained. Or, after the paste is formed in the ends of a pair of lead wires (not shown), the paste may be calcined at 120 to 240 ° C.

Since the temperature sensor constructed as described above uses a phenol resin as the starting material for the resistance element 2, the cost of the temperature sensor can be reduced considerably in comparison with a temperature sensor using a noble metal or an oxide semiconductor. Also, since the activation energy of the resistance element 2 is 0.06 to 0.27 eV, and the change in the resistance value due to an environment temperature is large up to the level of the oxide semiconductor, the resistance element 2 can be used to measure temperatures at ordinary temperatures. For comparison, a silver paste having a thermosetting resin, such as phenol or epoxy, as a binder is coated at both ends of the resistance element 2 as shown in FIG. 1, and the silver paste is thermoset, and thus a temperature sensor of a chip type such that electrodes 3 are formed at both ends of the resistance element 2 is obtained. Measurements were performed by the temperature sensor with it being surface-mounted on a printed board (not shown), or with lead wires (not shown) being connected to the electrodes 3. As a result, almost the same characteristics were obtained in the case where the resistance element 2 was used as a bulk and in the case where the resistance element 2 was formed into a paste.

When the carbonization temperature of the resistance element 2 is specified in the range of 640 to 750° C., the following experiment was carried out. Initially, a phenol resin lamination plate serving as a starting material was calcined for one hour at 400° C. in air and subjected to oxidation, after which this phenol resin lamination plate was heat-treated at each temperature of 600° C., 620° C., 640° C., 660° C., 700° C., 750° C., and 850° C. for three hours while the phenol resin lamination plate was being deaerated by a vacuum pump. Thus, seven types of carbonized material of different carbonization temperatures were manufactured. Next, the resistivity and the temperature characteristics of each of the bulk (hereinafter referred to as a bulk carbonized material resistance element) and the calcined product of the paste containing the powder of each carbonized material (hereinafter referred to as a paste resistance element) were measured. In this embodiment, each paste resistance element was formed by adding a xylene modulated phenol resin (0.44 g), carbinol (0.12 g), and acetone (an appropriate amount) into the powder (0.3 g) of each carbonized material at a mixing ratio indicated by the parentheses, kneading them until acetone was evaporated, and then dipping this paste on a copper-coated polyimide film and calcining the paste for 22 minutes at 200° C. If the paste is calcined at a temperature higher than the carbonization temperature, the characteristics of the carbonized material are changed; therefore it is necessary to calcine the paste at a temperature lower than the carbonization temperature.

① Measured Results of Resistivity

A constant voltage I (0.1 mA) was applied across both ends of the carbide, and the resistance value R=V/I was determined on the basis of the voltage V measured at a position of a length L (0.8 mm) of the inside of the carbide. The resistivity ρ of the bulk resistance element was determined on the basis of the resistance value R, the width W and the thickness T of the carbide:

$$\rho = R \cdot W \cdot T / L.$$

The resistivity ρ of the paste resistance element was determined as described below by measuring the length L, the width W and the thickness T, and the resistance value R of each calcined product:

$$\rho = R \cdot W \cdot T / L.$$

Figure 2:
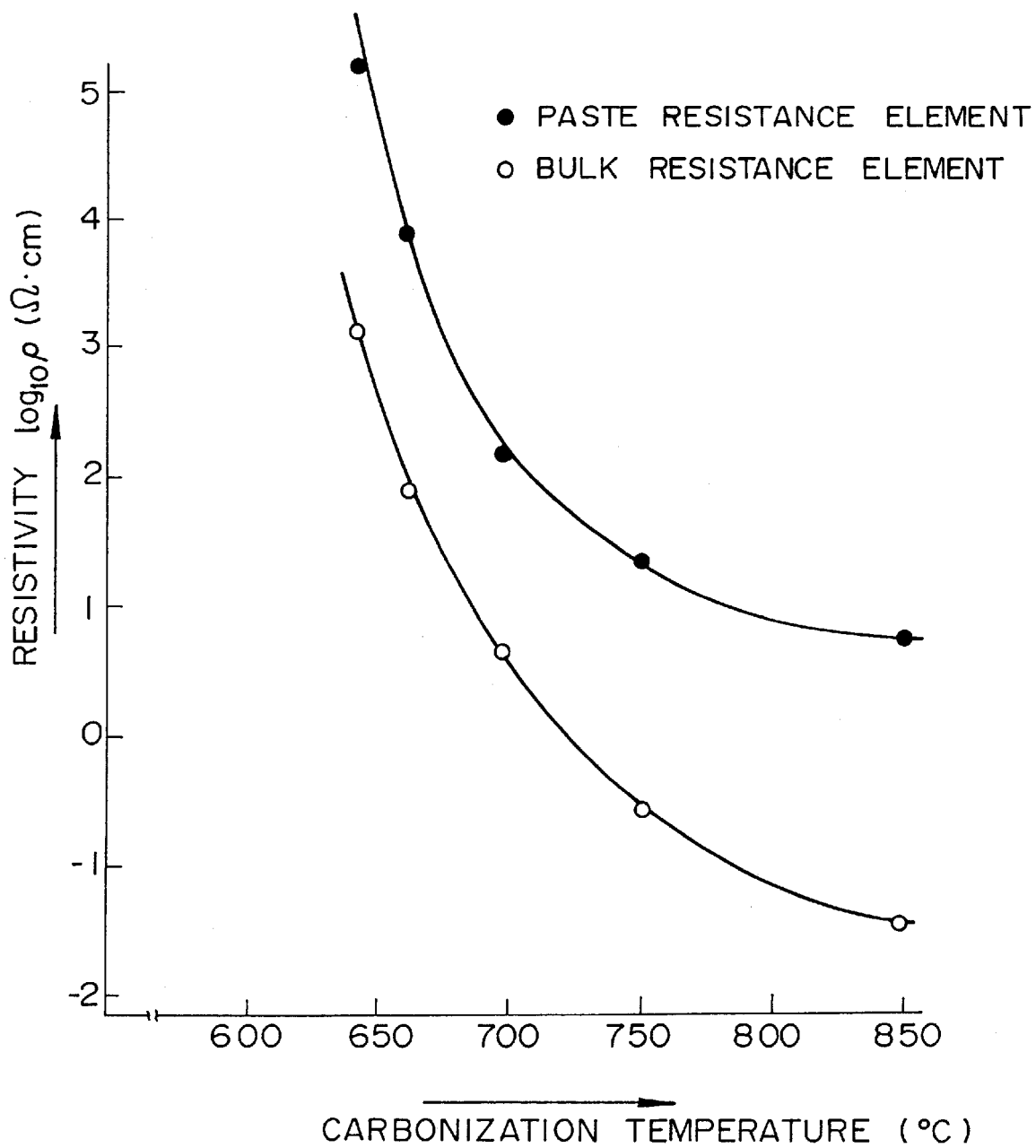
FIG. 2 is an illustration showing the relationship between resistivity and carbonization temperature.

FIG. 2 shows the measured results, and the resistivities are plotted on the vertical axis, and the carbonization temperatures are plotted on the horizontal axis. As is clear from FIG. 2, the resistivities of the bulk resistance element and the paste resistance element decrease logarithmically as the carbonization temperature increases respectively. The values of the resistivities are larger by several orders than the resistivity of graphite along its C axis. At each carbonization temperature of 610 to 850° C., the resistivity of the paste resistance element is a value respectively larger by approximately two orders than the resistivity of the bulk resistance element. For the samples of carbonization temperatures of 600° C. and 620° C., the insulation resistance is too high beyond the limit of measurement.

② Measured Results of Temperature Characteristics

The bulk resistance element and the paste resistance element were in sequence left to stand respectively under the environment of 20° C., 0° C., −20° C., −40° C., 20° C. (reference), 40° C., 70° C., 85° C., and 200° C., and the resistance values at those times were measured.

Figure 3:
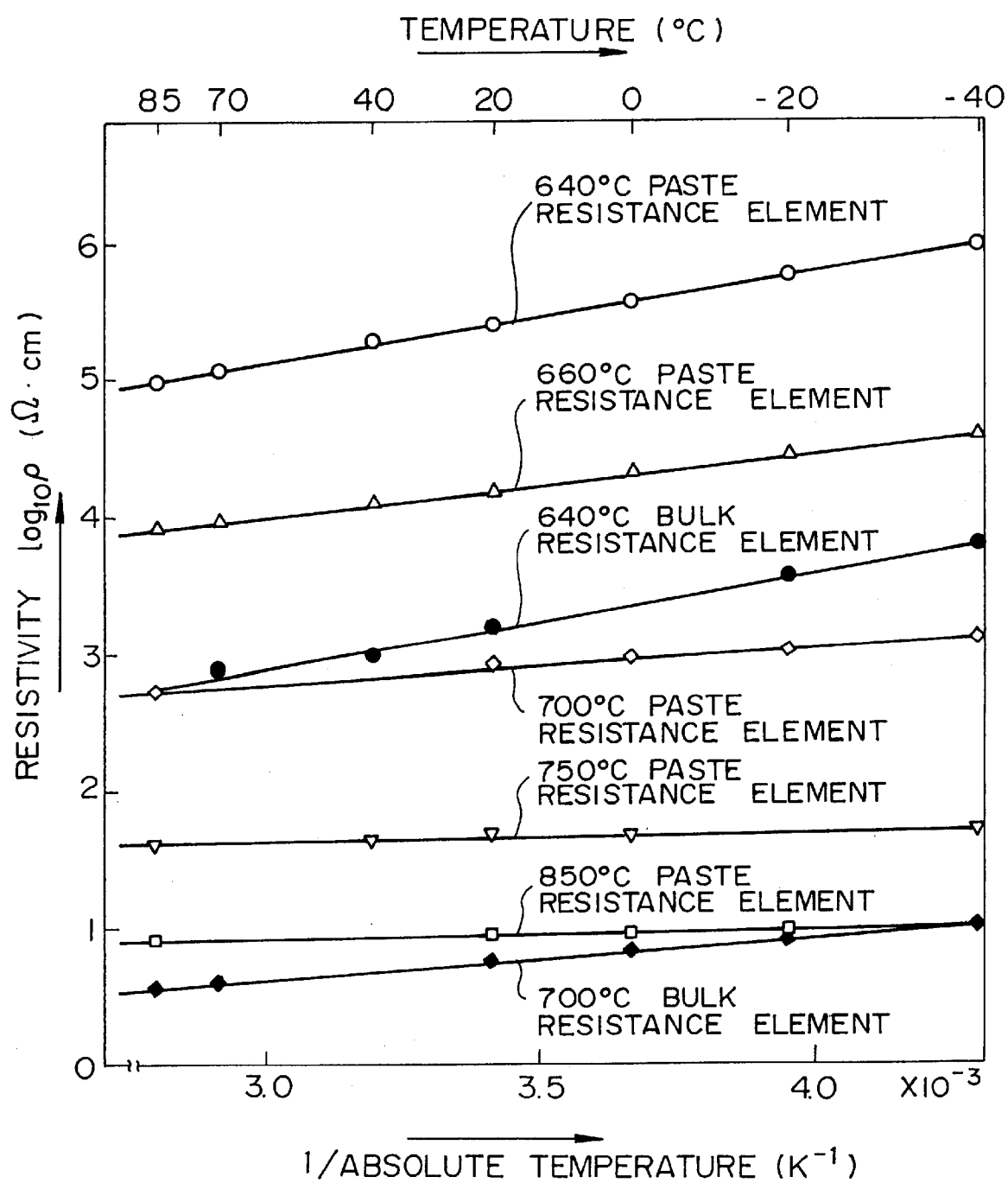
FIG. 3 is an illustration showing the relationship between resistivity and environment temperature.

FIG. 3 shows the measured results, and the resistivities are plotted on the vertical axis, and the environment temperature is plotted on the horizontal axis. As is clear from FIG. 3, the logarithm of the resistivity and the inverse number of the environment temperature are in direct proportion to each other. The gradients of the bulk resistance element and the paste resistance element at the same carbonization temperature match each other, and the gradients decrease as the carbonization temperature increases. Since the logarithm of the resistivity and the inverse number of the environment temperature are in direct proportion to each other, the bulk resistance element and the paste resistance element are assumed to obey a simple equation relating to a semiconductor:

$$\rho_T = \rho \infty \cdot EXP\ (\Delta E / 2kT) \tag{1}$$

where T is the absolute temperature, k is the Boltzmann's constant, and ρ∞ and ΔE are constants.

By substituting the measurement results of FIG. 3 in equation (1) in order to calculate ρ∞ and ΔE, the following can be obtained:

TABLE 1

| Resistance Element | Carbonization Temperature (° C.) | ρ· (Ω·cm) | Activation Energy ΔE (eV) |
|---|---|---|---|
| Paste resistance Element | 640 | 1060 | 0.27 |
| Bulk Resistance Element | 640 | 7.80 | 0.27 |
| Paste resistance Element | 660 | 425 | 0.18 |
| Paste resistance Element | 700 | 117 | 0.09 |
| Bulk Resistance Element | 700 | 0.65 | 0.11 |
| Paste resistance Element | 750 | 13.9 | 0.06 |
| Paste resistance Element | 850 | 4.9 | 0.03 |

It can be seen from Table 1 that, when the carbonization temperature exceeds 750° C., the activation energy ΔE becomes smaller than 0.06 (eV), and a change of the resistance value due to the environment temperature is too small to be unsuitable for use at ordinary temperatures. Therefore, it is clear from the above-described measured results of the resistivity and the temperature characteristics that, if a carbide having a carbonization temperature of 640 to 750° C. and the activation energy of 0.06 to 0.27 eV is used as the resistance element 2, the temperature sensor has excellent characteristics at ordinary temperatures.

As has been described up to this point, according to the present invention, a carbide having a carbonization temperature of 640 to 750° C. and an activation energy of 0.06 to 0.27 eV is used as a resistance element disposed between electrodes, and this resistance element is formed by calcining a paste which is mixed and dispersed into a binder at a temperature lower than 640° C. Thus, the temperature sensor can be formed by printing, and the total cost of the temperature sensor, including the cost of the materials and the manufacturing cost, can be reduced considerably, and the temperature sensor shows a large change of the resistance value with respect to the environment temperature change at ordinary temperatures. Therefore, it is possible to provide a temperature sensor of a type for use at ordinary temperatures at a low cost.

Many different embodiments of the present invention may be constructed without departing from the spirit and scope of the present invention. It should be understood that the present invention is not limited to the specific embodiments described in this specification. To the contrary, the present invention is intended to cover various modifications and equivalent arrangements included within the spirit and scope of the invention as hereafter claimed. The scope of the following claims is to be accorded the broadest interpretation so as to encompass all such modifications, equivalent structures, and functions.

What is claimed is:

1. A method for making a temperature sensor comprising a resistance element disposed between a pair of electrodes, the method comprising the steps of:

carbonizing a carbon base material at a temperature of 640° C. to 750° C. to form a carbonized material having an activation energy of 0.06 eV to 0.27 eV;

mixing the powder of said carbonized material and a binding resin to form a paste;

applying said paste onto a base and calcining said paste at a temperature of 120° C. to 640° C. to form a temperature sensor of $10^{1.3}$ to $10^{5.6}$ Ωcm; and forming said pair of electrodes on said base.

2. A method for making a temperature sensor according to claim 1, wherein said base comprises a polyimide film and said paste is calcined at a temperature of 120° C. to 200° C.

* * * * *